Patented July 26, 1949

2,477,236

UNITED STATES PATENT OFFICE 2,477,236

ASBESTOS-ALUMINUM COATING COMPOSITION

Duncan F. Buchanan, Berkeley, Calif., assignor to The Paraffine Companies, Inc., San Francisco, Calif., a corporation of Delaware No Drawing. Application May 11, 1946, Serial No. 669,111

4 Claims. (Cl. 106—282)

My invention relates to a coating composition, and more particularly to an aluminum paint and the process of making the same.

Aluminum paints, consisting essentially of aluminum powder of the so-called bronzing type, a bituminous material and a volatile solvent, are well known in the art. They are desirable as coatings on roofings or the like because of their well known property of reflecting solar heat, thus minimizing conduction of heat through the material coated. The film formed by a paint of this type is comparatively thin; and in order to provide a coating that will last over a reasonable period, it is usually necessary to apply more than one coat of the paint. This of course involves added expense of the additional paint required, and the labor cost of applying a plurality of coats.

It is among the objects of my invention to provide an improved aluminum paint of the type described which has incorporated therein a suitable filler in such proportions and in which the solvent, the bituminous material and the aluminum powder are in such proportions with respect to each other and with respect to the filler, as to enable the paint to be applied as a relatively thick wear resisting coat so that one coat thereof need only be applied to an object to be painted; which will provide an exposed surface having substantially the same bright metallic aluminum appearing color as the paint without the filler; which is economical, and easy to apply; and which can be readily manufactured. Other objects of my invention will become apparent from a perusal of the following description thereof.

The paint of my invention consists essentially of aluminum flakes or powder, preferably of the so-called bronzing type, a bituminous material, the filler, and volatile solvent, in the sense that these substances are the important ingredients of the composition. Other substances, such as pigments may be employed, but they are not essential to the type of paint to which my invention relates. I have found that even though one might expect that incorporation of a filler in an aluminum paint of the type consisting essentially of the aluminum powder, the bituminous material and the solvent would result in a thicker coating film when the paint is applied to a surface, such incorporation of the filler presents the problem of maintaining the metallic aluminum appearing color of the resultant paint coating, especially on the exposed surface thereof. The filler usually results in a coating leaving a decided trend toward an undesirable brownish color.

In the paint of my invention, the objectionable brownish color is avoided in the paint coating by employing the named ingredients in such proportions, to be subsequently described, as to cause the aluminum powder or flakes to be at the surface of the paint as well as uniformly throughout the body thereof when the paint is applied, so that the powder will "float" at such surface substantially without being covered by a film of the bituminous material. To obtain this "floating" effect the paint of my invention compared to previous aluminum paints consisting essentially of bituminous material, solvent, and aluminum powder has a decreased bituminous material content; and the solvent content is increased and of such character as to impart the desirable "floating" to the aluminum powder; the remainder being filler.

In general, I have found that the paint of my invention should have a volatile solvent to bituminous material ratio of approximately one and one-half (1½) to two and one-half (2½) parts by weight of the solvent to about one (1) part by weight of the bituminous material; and the bituminous material to aluminum powder ratio should be approximately one and one-half (1½) to four (4) parts by weight of the bituminous material to one (1) part by weight of the aluminum powder, the remainder being the filler. The proportions of the aluminum powder are on the basis of the substantially pure powder.

Instead of substantially pure powder, any of the well known commercial aluminum pastes suitable for blending with varnish, or other vehicle for making bronzing paints may be employed instead. Such aluminum paste contains volatile solvent; and when employed, the volatile solvent otherwise used in a specific paint formula should be reduced a proportionate amount. Aluminum paste contains approximately thirty (30) to thirty-five (35) parts by weight of volatile solvent; so that with the powder, approximately thirty (30) to thirty-five (35) percent less by weight is used in the paint compared to aluminum paste, and the difference made up by additional solvent.

With respect to succeeding formulae, both aluminum paste and powder appear. Consequently, it is to be understood that the proportions of the aluminum and the solvent may be varied along the lines discussed according to whether the aluminum paste is substituted for the aluminum powder, or vice versa. The same is to be understood with respect to any of the claims that recite proportions.

A preferred range of proportions of the ingredients in the paint of my invention, in parts by weight, is as follows:

| | |
|---|---|
| Bituminous material | 24 to 33 |
| Volatile solvent for the bituminous material | 45 to 57 |
| Filler (preferably asbestos fibre) | 4.8 to 10.5 |
| Aluminum powder | 8 to 18 |

As the filler, I have found asbestos type fibre to be the most suitable; and it is preferred for best results. Preferably, the fibre is so-called Canadian asbestos fibre of 0-0-10-6 commercial grade, namely the number of ounces of fibre in a sixteen (16) ounce sample that are retained on successive screens of one-half inch (½"), one-quarter inch (¼") and one-tenth (1/10") mesh, and that pass through the one-tenth (1/10") mesh, respectively. The coarser the fibre the rougher will be the surface of the resultant paint coating. This determines the coarseness of the fibre from a practical purpose.

A fibre having a grading of 0-4-8-4 on the same basis mentioned will produce a usable product but in addition to a rougher film, the paint itself will not have as good a spreading capacity as the paint with finer fibre. Finer fibre, as low as 0-0-1-15 grading or even lower, may be employed but then the paint may not result in as thick a film as desired. In place of the preferred Canadian asbestos fibre, other sources of asbestos may be employed, such as Arizona or Vermont asbestos, which lend themselves readily to breaking up into the preferred mesh size and which may be readily dispersed in the paint.

Some of the fibre may be replaced by suitable extenders, such as comminuted diatomaceous earth, powdered talc or soapstone. If diatomaceous earth is employed, about twenty percent (20%) to thirty percent (30%) of the volume of asbestos fibre may be replaced by the earth. Powdered talc or soapstone may be substituted pound for pound for an equal weight of the asbestos fibre, up to about twenty percent (20%) of the total weight of fibre. Finely ground anthophyllite or tremollite may be used under similar conditions. It is important for best results that a substantial proportion of the filler be of the asbestos type fibre, although some of the asbestos type fibre may be replaced in part by suitable extenders.

In addition to extenders of the type described above, color effects may be obtained in my paint, by employment of suitable relatively small proportions of color pigments to replace some of the fibre, or extenders if employed, without loss of the metallic appearing surface produced by the aluminum powder. For example, iron oxide may be used to product a pleasing reddish color almost like metallic copper. Graphite may be used to produce a metallic slate appearance, and chrome oxide will impart a greenish tinge to the metallic lustre created by the aluminum. These pigments are employed in conjunction with the essential ingredients of my paint, namely the filler preferably asbestos type fibre, the bituminous material, the aluminum powder, and the volatile solvent.

Asphalt is the preferred bituminous material, preferably air blown asphalt having an A. S. T. M. (designation D36—26) softening point not much lower than about one hundred and thirty degrees Fahrenheit (130° F.) and about sixty (60) maximum A. S. T. M. penetration at seventy-seven degrees Fahrenheit (77° F.). Best results are, however, obtained with approximately two hundred degrees Fahrenheit (200° F.) softening point air blown California asphalt having an A. S. T. M. penetration at seventy-seven degrees Fahrenheit (77° F.) of about twelve (12) to fourteen (14).

Coal tar pitches having characteristics similar to the preferred asphalt may be also used as the bituminous material. However, "stearine" pitches, although they may be employed, do not produce as good results as the asphalt, or coal tar pitch.

Crude solvent naphtha is the preferred volatile solvent. For best results, it is desirable to employ a naphtha having the following distillation range:

At one hundred and fifty degrees centigrade
    (150° C.) ___ five percent (5) maximum
At one hundred and sixty-five degrees centigrade (165° C.) ___ five percent (5) minimum
At two hundred degrees centigrade (200° C.)
    ninety percent (90) minimum In place of solvent naphtha, petroleum thinner of the paint thinning grade having a high content of aromatic constituents, enhanced by dissolving ten (10) to twenty (20) percent by weight of crude naphthalene therein, may be employed. No. 1 creosote covered by American Wood Preservers Association specification W. 4 for creosote oil, may also be used but not as satisfactorily as the preferred type of solvent because of its relatively slow evaporation rate. Creosote oil covered by Federal Specification T.-W-561a dated January 9, 1934, may be used but it presents the same problem as the previously mentioned creosote. Mixtures of the various solvents mentioned may be utilized in any proportions.

The following are typical formulae of the product of my invention, Formula 1 being preferred as it has been found to produce the most satisfactory paint. The ingredients are in approximate parts by weight.

1

| | Parts by weight |
|---|---|
| 200° F. softening point, air blown California asphalt | 25.5 |
| Crude solvent naphtha | 49.4 |
| Asbestos fibre (0-0-10-6 mesh on basis described above) | 7.9 |
| Aluminum paste (Fed. specification TT-A-466 Type A) | 17.2 |

2

| | |
|---|---|
| 200° F. softening point, air blown California asphalt | 24.6 |
| High aromatic petroleum solvent containing 10% by weight naphthalene | 50.3 |
| Asbestos fibre (0-0-10-6 mesh in basis described above) | 10.1 |
| Aluminum paste (Fed. specification TT-A-466 Type A) | 15.0 |

3

| | |
|---|---|
| High bitumen coal tar pitch of 130° F. softening point | 24.0 |
| Crude solvent naphtha | 51.0 |
| Asbestos fibre (0-0-10-6 mesh on basis described above) | 9.0 |
| Aluminum powder (Fed. specification TT-A-468 Type 1, Class 1) | 16.0 |

4

| | |
|---|---|
| 200° F. softening point, air blown California asphalt | 25.5 |
| Crude solvent naphtha | 57.1 |
| Asbestos fibre (0-0-10-6 mesh on basis described above) | 9.2 |
| Aluminum powder ("Alcoa" A422) | 8.2 |

It is possible with the composition of my invention to provide a material which does not have the requisite amount of solvent when packaged, with instructions that it be thinned before use with a specified amount of desired thinner.

However, my paint is preferably employed as a ready-mixed or ready-to-use composition that may be applied directly as a coating, without further mixing, other than the usual mere stirring. The paint made according to my preferred formula will produce a coating approximately seven one-thousandths (0.007) of an inch thick compared to a coating of approximately two one thousandths (0.002) of an inch thick usually formed by aluminum paints consisting essentially of aluminum powder, solvent, and bituminous material. Thus the paint of my invention will usually form coatings over three times thicker than such paints without the filler.

My paint is particularly adapted for application to asphaltic prepared roofing and asphaltic shingles. It is also useful for painting galvanized iron roofing and siding, and for the painting of electric wire and cable; and it may be applied either by spray or brush.

Any suitable method may be employed for thoroughly mixing the ingredients, to produce a more or less homogeneous mass. A preferred method of preparation is first to pour the bituminous material in heated molten condition into a suitable heated container, adding the volatile solvent while stirring until a homogeneous mass obtains, cooling to about room temperature after the solvent is thoroughly mixed with the bituminous material, adding the filler while stirring until a uniform mixture is obtained, and finally incorporating the aluminum powder or paste while stirring until all evidence of lumps disappear.

I claim:

1. A metallic ornamental paint consisting essentially of the following ingredients in approximately the following proportions in parts by weight:

| | |
|---|---|
| Asphalt | 24 to 33 |
| Crude solvent naphtha | 45 to 57 |
| Asbestos fibre | 4.8 to 10.5 |
| Aluminum powder | 8 to 18 |

2. A metallic ornamental paint consisting essentially of the following ingredients in approximately the following proportions in parts by weight:

| | |
|---|---|
| Air blown asphalt | 25.5 |
| Crude solvent naphtha | 49.4 |
| Asbestos fibre | 7.9 |
| Aluminum paste | 17.2 |

3. As solvent-thinned ornamental aluminum powder-bituminous paint of a viscosity for application to a surface by brushing or spraying and which contains an amount of filler the majority of which is asbestos fibre sufficient to adapt such paint upon application to said surface to produce a relatively thick coating compared to such type of paint without said filler; said paint consisting essentially of the following four ingredients: bituminous material, volatile solvent for the bituminous material, said filler, and aluminum powder; the volatile solvent being the major constituent of said paint, and the amount thereof by weight being in such substantial excess with respect to the weight of aluminum powder and the weight of the bituminous material as to cause said powder to float to the surface of a coating of said paint when applied without being covered by a film of the bituminous material so that the resultant coating will have said ornamental metallic appearance in the presence of said filler; and the amounts by weight of each of said filler and said aluminum powder being in a minor proportion and being each less than the amount by weight of said bituminous material the amount of asbestos being at least 4.7% by weight of the composition, the ratio of volatile solvent to bituminous material being approximately 1½ to 2½ parts by weight of solvent to about 1 part by weight of bituminous material, and the ratio of bituminous material to aluminum being approximately 1½ to 4 parts by weight of bituminous material to one part by weight of aluminum.

4. A solvent-thinned ornamental aluminum powder-bituminous paint of a viscosity for application to a surface by brushing or spraying and which contains an amount of filler the majority of which is asbestos fibre sufficient to adapt such paint upon application to said surface to produce a relatively thick coating compared to such type of paint without said filler; said paint consisting essentially of the following four ingredients: bituminous material, volatile solvent for the bituminous material, said filler, and aluminum powder; the volatile solvent being the major constituent of said paint, and the amount thereof by weight being in such substantial excess with respect to the weight of aluminum powder and the weight of the bituminous material as to cause said powder to float to the surface of a coating of said paint when applied without being covered by a film of the bituminous material so that the resultant coating will have said ornamental metallic appearance in the presence of said filler; the amounts by weight of each of said filler and said aluminum powder being in a minor proportion and being each less than the amount by weight of said bituminous material the amount of asbestos being at least 4.7% by weight of the composition, the ratio of volatile solvent to bituminous material being approximately 1½ to 2½ parts by weight of solvent to about 1 part by weight of bituminous material, and the ratio of bituminous material to aluminum being approximately 1½ to 4 parts by weight of bituminous material to one part by weight of aluminum; and the asbestos fibre of said filler being relatively fine to enhance spreading capacity of the paint and to provide a relatively smooth surface on the resultant paint coating.

DUNCAN F. BUCHANAN.

REFERENCES CITED

The following references are of record in the file of this patent:

UNITED STATES PATENTS

| Number | Name | Date |
|---|---|---|
| 1,568,215 | Fleming | Jan. 5, 1926 |
| 2,131,085 | Anderton | Sept. 27, 1938 |
| 2,201,981 | Baron | May 28, 1940 |
| 2,332,219 | Harsberger | Oct. 19, 1943 |
| 2,385,437 | Fasold et al. | Sept. 25, 1945 |

OTHER REFERENCES

Industrial and Engineering Chemistry, January 1934, pages 88–91, article by Fain et al., "Pigmented Bitumastic Compositions."